United States Patent Office.

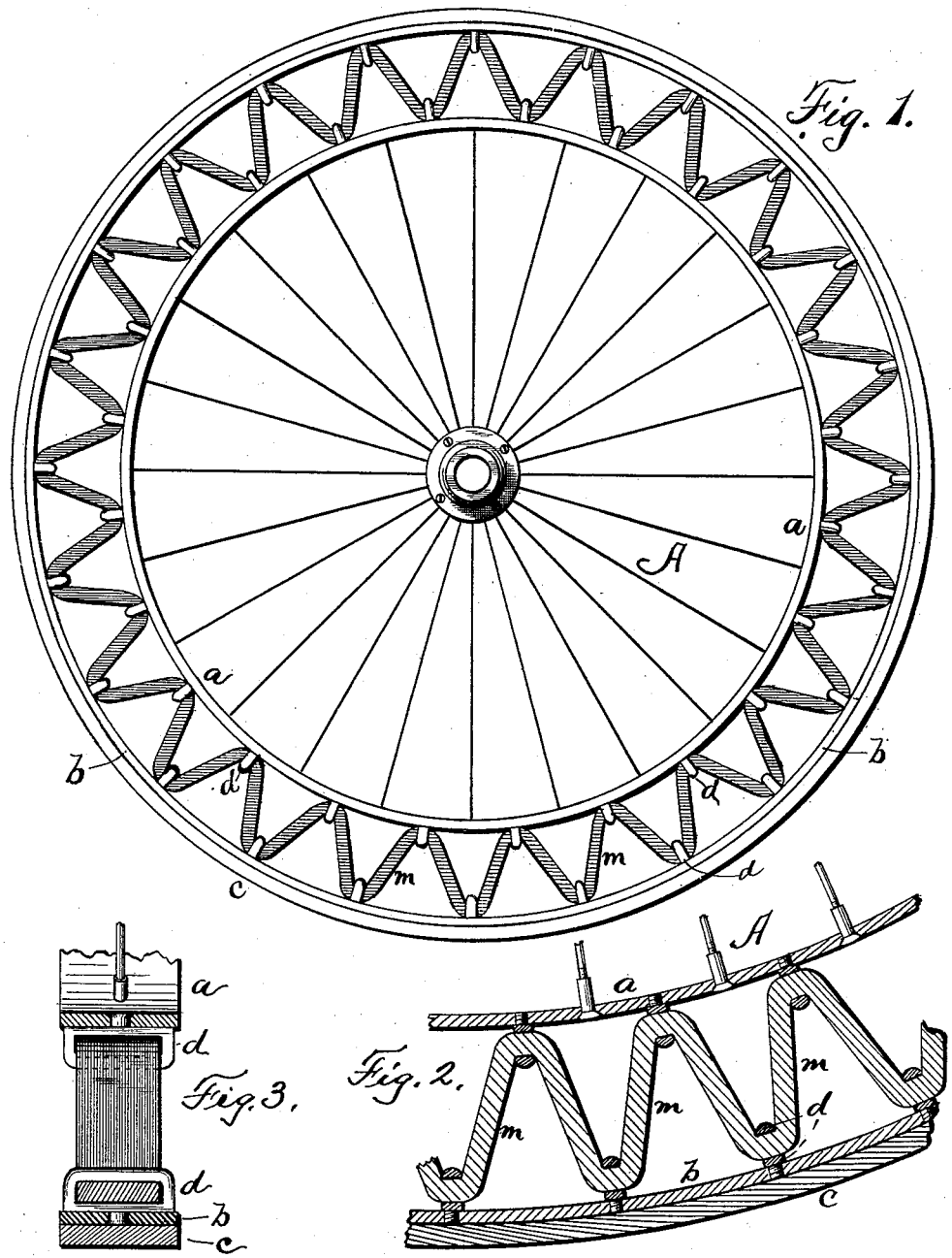

GEORGE HOLLAFOLLA, OF SYRACUSE, NEW YORK.

VEHICLE-WHEEL.

SPECIFICATION forming part of Letters Patent No. 482,175, dated September 6, 1892.

Application filed May 9, 1892. Serial No. 432,239. (No model.)

*To all whom it may concern:*

Be it known that I, GEORGE HOLLAFOLLA, of Syracuse, in the county of Onondaga, in the State of New York, have invented new and useful Improvements in Vehicle-Wheels, of which the following, taken in connection with the accompanying drawings, is a full, clear, and exact description.

My invention relates to vehicle-wheels, and particularly to that class which are provided with a cushion device for the purpose of taking up the concussion as well as carrying the load.

The object of my invention is to provide a simple, durable, and effective cushion for vehicle-wheels, designed to be used either alone for that purpose or in conjunction with either a rubber tire or a pneumatic tire, as in bicycles, consisting, broadly, in constructing the wheel with a main felly and an auxiliary felly exterior thereto and concentric therewith, the latter being supported and maintained in a position substantially parallel to the main felly by my cushion interposed between the two fellies, and forming, also, the connection between them.

My invention consists in the several novel features of construction and operation hereinafter described, and which are specifically set forth in the claim hereunto annexed.

It is constructed as follows, reference being had to the accompanying drawings, in which—

Figure 1 is a side elevation of a wheel complete. Fig. 2 is an enlarged view of a portion of a double rim of the wheel. Fig. 3 is a transverse sectional elevation of the double felly or rim and the intervening and connecting cushion.

A is a vehicle-wheel comprising a hub, spokes, and a felly or rim $a$, all of which may be constructed in the ordinary manner. Another felly $b$, of larger diameter than the rim $a$, is connected to the smaller rim and supported by it in substantially a position parallel thereto. This outer rim or felly may be of any shape in cross-section desired in order to enable it to receive and hold a tire $c$ of any construction desired.

On the inside of the outer felly and upon the outside of the inner felly I secure the loops or rings $d$ in alternating arrangement to each other. (Shown in the drawings as secured to said rings by studs either screwed into them or riveted therein.) Through these loops I string a heavy band of rubber $m$, as shown in the drawings, which band fits snugly in the loops and serve both to connect the two fellies and support the outer felly in position and to maintain it in proper position, and also operates as an auxiliary to the tire proper upon the outer felly to take up the concussion, as will be readily seen without further explanation.

I do not limit myself to the precise form or construction of the parts as shown in the drawings, inasmuch as the principle of my invention is the insertion of the continuous or substantially continuous band of elastic material between the inner and outer fellies of a double-felly wheel, such band being the connection between them and by which the outer felly is supported and maintained in its proper position.

What I claim as my invention, and desire to secure by Letters Patent, is—

A vehicle-wheel comprising a hub, spokes, and two fellies substantially parallel to each other, connected together by a band of elastic material strung through loops arranged alternately upon the two fellies.

In witness whereof I have hereunto set my hand this 7th day of May, 1892.

GEO. HOLLAFOLLA.

In presence of—
C. W. SMITH,
HOWARD P. DENISON.